US007983656B2

(12) United States Patent
Nguyen et al.

(10) Patent No.: US 7,983,656 B2
(45) Date of Patent: Jul. 19, 2011

(54) METHOD AND APPARATUS FOR END-TO-END MOBILE USER SECURITY

(75) Inventors: Nam Nguyen, San Jose, CA (US);
Donggen Zhang, Fremont, CA (US);
Paul Tomalenas, Alamo, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 979 days.

(21) Appl. No.: 11/854,058

(22) Filed: Sep. 12, 2007

(65) Prior Publication Data

US 2009/0068985 A1 Mar. 12, 2009

(51) Int. Cl.
*H04M 3/16* (2006.01)
(52) U.S. Cl. ........ 455/411; 455/410; 455/433; 455/560; 380/247; 380/248; 380/249; 380/270; 380/273; 380/282; 380/44; 713/156; 713/168; 713/169; 713/170; 713/171; 713/175; 726/2; 726/3
(58) Field of Classification Search .................. 455/410, 455/411; 380/247–250, 270–274, 278, 279, 380/282, 284, 285, 43, 44; 713/155–159, 713/168–181; 726/1–26
See application file for complete search history.

(56) References Cited

U.S. PATENT DOCUMENTS

| | | | | |
|---|---|---|---|---|
| 4,200,770 A * | 4/1980 | Hellman et al. | ................. | 380/30 |
| 6,192,474 B1 * | 2/2001 | Patel et al. | ................... | 713/171 |
| 6,987,855 B1 * | 1/2006 | Srivastava | ..................... | 380/278 |
| 7,123,721 B2 * | 10/2006 | Panjwani et al. | ............. | 380/270 |
| 7,382,882 B1 * | 6/2008 | Immonen | ...................... | 380/270 |
| 7,437,574 B2 * | 10/2008 | Ronkka et al. | ................ | 713/194 |
| 7,657,748 B2 * | 2/2010 | Gentry | .......................... | 713/170 |
| 7,715,822 B2 * | 5/2010 | Semple et al. | ................ | 455/411 |
| 7,716,483 B2 * | 5/2010 | Sozzani et al. | ................ | 713/171 |
| 7,783,041 B2 * | 8/2010 | Asokan et al. | ................ | 380/255 |
| 2002/0186846 A1 * | 12/2002 | Nyberg et al. | ................ | 380/273 |
| 2004/0250073 A1 * | 12/2004 | Cukier et al. | ................. | 713/171 |

FOREIGN PATENT DOCUMENTS

| | | |
|---|---|---|
| JP | 2005176340 | 6/2005 |
| KR | 20010091596 | 10/2001 |
| WO | WO0120925 | 3/2001 |
| WO | W02007019774 | 2/2007 |
| WO | W02007051415 | 5/2007 |

OTHER PUBLICATIONS

K. Kaabneh and H. Al-Bdour, Key Exchange Protocol in Elliptic Curve Crytography with No Public Point, 2005 Science Publications, Americal Journal of Applied Sciences 2 (8): 1232-1235, 2005.*

* cited by examiner

*Primary Examiner* — Olumide T Ajibade Akonai
(74) *Attorney, Agent, or Firm* — Ed Guntin; Guntin Meles & Gust PLC

(57) ABSTRACT

A system that incorporates teachings of the present disclosure may include, for example, a server having a controller to implement an Elliptic Curve Diffie-Hellman (ECDH) cryptosystem and manage a key exchange, authentication, and certificate exchange with a communication device also implementing the ECDH cryptosystem, wherein the server communicates over a network that provides an encrypted communication link for the communication device. Other embodiments are disclosed.

22 Claims, 6 Drawing Sheets

400

200

116

METHOD AND APPARATUS FOR END-TO-END MOBILE USER SECURITY

FIELD OF THE DISCLOSURE

The present disclosure relates generally to communication systems and more specifically to a method and apparatus for end-to-end mobile user security in a network.

BACKGROUND

Most current mobile phones connect to a cellular network of base stations which are in turn interconnected to the public switched telephone network (PSTN). Global System for Mobile Communications (GSM) is the most popular standard for mobile phones in the world. GSM technology operates over a cellular network and due to certain technological advances is considered a second generation mobile phone system.

Although GSM differs significantly from its predecessor technologies with regard to signaling and speech channels, GSM is still vulnerable to basic forms of passive security attack, such as eavesdropping. This is mainly due to a signaling link within the fixed infrastructure part of the GSM signaling network which can expose users' unencrypted phone calls and data to an attacker if the attacker can manage to gain direct access to the signaling network.

GSM communications today are encrypted at the RF link between the cell phone and base station. The fixed link between the GSM base station and a mobile switching center providing the backbone of GSM network is however unencrypted.

DETAILED DESCRIPTION

In one embodiment of the present disclosure, a computer readable storage medium can have instructions for providing information associated with an Elliptic Curve Diffie-Hellman (ECDH) cryptosystem to a group of Mobile Stations (MSs) using a base transceiver station, authenticating a first MS of the group of MSs using a first Visitor Location Register (VLR) of a Mobile Switching Center (MSC) and authenticating a second MS of the group of MSs with a second VLR of the MSC, sending a first certificate of the first MS from the first VLR to the second VLR and sending a second certificate of the second MS from the second VLR to the first VLR, and sending the first certificate from the second VLR to the second MS and sending the second certificate from the first VLR to the first MS, wherein data communicated between the first MS and the second MS is encrypted with a secret key computed individually by both the first MS and the second MS from the first certificate and the second certificate, respectively.

In another embodiment of the present disclosure, a network element can have a controller to establish connectivity between at least two Mobile Stations (MSs) that are implementing a key exchange algorithm with a Mobile Switching Center (MSC), wherein the at least two MSs each compute their own secret keys using the key exchange algorithm individually with their own private keys, wherein the at least two MSs encrypt data transmitted by the network element with their own secret keys, and wherein the at least two MSs communicate with each other using the encrypted data.

In another embodiment of the present disclosure, a server can have a controller to implement an Elliptic Curve Diffie-Hellman (ECDH) cryptosystem and manage a key exchange, authentication, and certificate exchange with a communication device also implementing the ECDH cryptosystem, wherein the server communicates over a network that provides an encrypted communication link for the communication device.

In another embodiment of the present disclosure, a method can involve implementing an Elliptic Curve Diffie-Hellman (ECDH) cryptosystem on at least two Mobile Stations (MSs) and a Mobile Switching Center (MSC), wherein each of the at least two MSs produces its own secret key used for data encryption from its own respective private keys during a key exchange, and providing an encrypted communication link between the at least two MSs using the ECDH cryptosystem.

Figure 1:
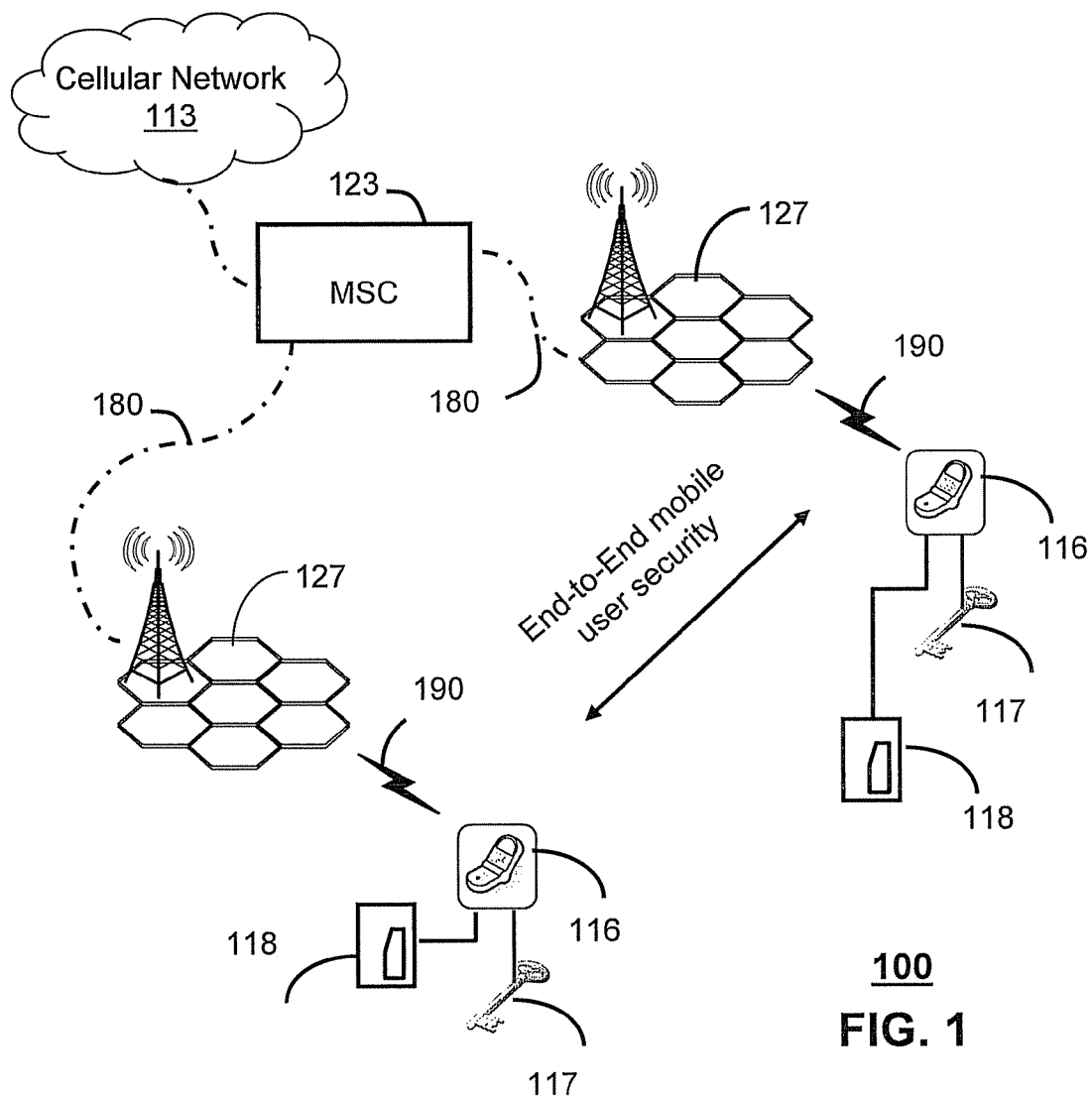
FIG. 1 depict an exemplary embodiment of a communication system.

FIG. 1 depicts an exemplary embodiment of a communication system 100. The communication system 100 can comprise a cellular network 113, a mobile switching center (MSC) 123, at least one base station 127, and at least one mobile station (MS). The BTS 127 can provide connectivity between the MS 116 and the MSC 123 via one or more modes of communication, such as radio interface 180 and microwave link 190. The MS 116 can be a cell phone device or any other communication device. The present disclosure also contemplates the use of other types of communication devices, including other types of voice, video and data devices. The foregoing components of the communication system 100 can utilize common computing and communications technologies to support circuit-switched and/or packet-switched communications.

The cellular network 113 can support voice and data services over a number of access technologies such as GSM, GSM-GPRS, EDGE, CDMA-1X, UMTS, WiMAX, software defined radio (SDR), and other known and future technologies. In one arrangement, the cellular network 113 can be coupled to base stations 127 under a frequency-reuse plan for communicating over-the-air with roaming MS 116. The communication system 100 can also comprise a packet-switched network (not shown), which can be an Internet Service Provider (ISP) network The MS 116 can include an identification module 118, such as a secure identification or identity module (e.g., a SIM card), containing subscription information, account data, personal information, and private/public key information. The identification module 118 can have an associated memory (not shown) for storing data associated with a private key. The private key can be used to generate a public key which can be used to securely encrypt data. The private key is kept secret, while the public key may be widely distributed. The keys are related mathematically, but the private key cannot be practically derived from the public key. Data encrypted with the public key can be decrypted only with the corresponding private key. This can be used to ensure confidentiality. Data signed with the sender's private key can be verified by anyone who has access to the sender's public key, thereby proving that the sender signed it and that the message has not been tampered with. This can be used to ensure authenticity.

The communication system 100 can provide an end-to-end mobile user security. As an example, at least two MSs 116 in the communication system 100 can implement a key exchange algorithm 117 for secret key generation. Each MS 116 can generate a secret key that can be used to encrypt data exchanged between the two MSs 116. In one embodiment, only the two MSs 116 can compute the secret key used for data encryption. This can ensure that the encrypted data transmitted through out the entire cellular network 113 (both radio link 180 and fixed signaling portion of the microwave link 190) can be decrypted only by the two communicating users and hence mitigate eavesdroping.

Figure 2:
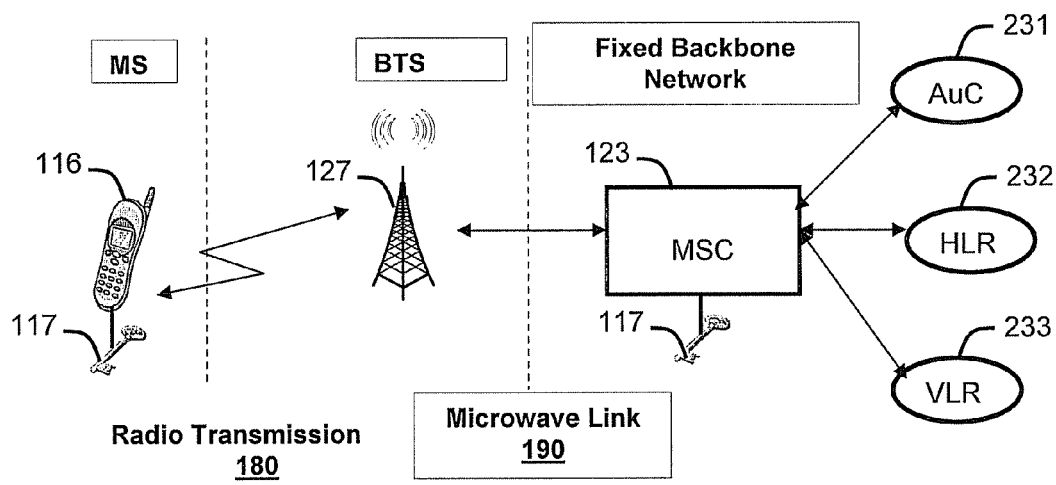
FIG. 2 depicts an exemplary communication channel of the communication system.

FIG. 2 depicts an exemplary communication channel 200 for a portion of the communication system 100. The communication channel 200 is composed of three main components: the mobile station (MS) 116, the base transceiver station (BTS) 127, and the mobile switching center (MSC) 123. The radio link 180 is shown between the MS 116 and the BTS 127. The signaling portion of the microwave link 190 is shown between the BTS 127 and the MSC 123. The MS 116 and the MSC 123 each implement the key exchange algorithm 117 to encrypt the entire communication channel 200 and ensure security across the radio link 180 and the signaling link 190.

The MSC 123 can include an authentication center (AuC) 231, a Home Location Register (HLR) 232, and/or a Visitor Location Register (VLR) 232 each implementing the key exchange algorithm 117. The key exchange algorithm 117 protects the security of the entire communication channel between any two mobile users. The key exchange algorithm can be based on the Elliptic Curve Diffie-Hellman (ECDH) cryptosystem, which itself is a key exchange algorithm that is based on Elliptic Curve Cryptography (ECC) for public/private key generation ECC is an approach to public-key cryptography based on an algebraic structure of elliptic curves over finite fields. An elliptic curve is a plane curve defined by an equation of the form $y^2=x^3+ax+b$. The set of points on such a curve can be shown to form a commutative group G, such that $a*b=b*a$ for all a and b in G. Elliptic Curve Diffie-Hellman (ECDH) is a key agreement protocol that allows the two MSs to establish a shared secret key over an insecure channel. The secret key can then be used to encrypt subsequent communications using a symmetric key cipher.

In a GSM network, the key exchange algorithm 117 can replace ciphering algorithms GSM uses for authenticating the MS (which is called A3), secret key generation (called A8), and data encryption of radio traffic (called A5). The A3-A8 algorithms are proprietary algorithms which have not been thoroughly evaluated by the public cryptography community, in part due to proprietary reasons. As noted in the current field of cryptography research, A3, A5, and A8 are all vulnerable to crypto-analytical attacks and can compromise the exchange of sensitive information between MSs 116 in the communication system 100.

In one exemplary configuration, the A3, A5, and A8 algorithms can be replaced with the ECDH algorithm 117 in both the GSM users' SIM cards 118 and the GSM AuC 231 server to achieve high-level security. Due to the inherent nature of ECDH cryptosystem, the secret key used in data encryption can only be computed by the two MSs 116 of the communicating users using their own private keys. No one else in the communication system 100 can compute the secret key, including the GSM authentication center 231. This ensures that the encrypted data transmitted through out the entire GSM network—both radio link 210 and fixed signaling link 220—can be decrypted only by the two communicating MSs.

The authentication center 231 can compute its own authentication key using its own private key separately from the MSs. The authentication key used to authenticate a user with the GSM network. This prevents the GSM authentication center 231 from having to store users' authentication keys in it's database. This eliminates any chance of an intruder hacking the database for authentication keys. Furthermore, the ECC is more efficient compared to other available public-key cryptosystems (such as RSA and DSA). ECC provides equivalent security as others cryptosystems but with smaller key sizes. Implementing ECC as the key encryption algorithm 117 on MS 116 and MSC 123 as shown in FIG. 2 leads to a new wireless security architecture that has higher speeds, lower power consumption, bandwidth savings, storage efficiencies, and smaller certificates.

Figure 3:
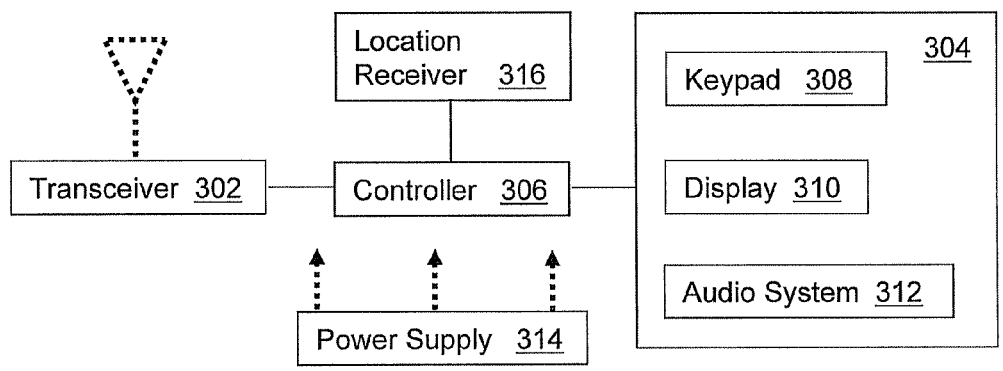
FIG. 3 depicts an exemplary embodiment of a mobile communication device.

FIG. 3 depicts an exemplary embodiment of the communication device 116. The communication device 116 can comprise a wired and/or wireless transceiver 302, a user interface (UI) 304, a power supply 314, a location receiver 316, and a controller 306 for managing operations thereof. In an embodiment where the communication device 116 operates in a landline environment, the transceiver 302 can utilize common wireline access technology to support POTS or VoIP services.

In a wireless communications setting, the transceiver 302 can utilize common technologies to support singly or in combination any number of wireless access technologies including without limitation cordless phone technology (e.g., DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. SDR can be utilized for accessing a public or private communication spectrum according to any number of communication protocols that can be dynamically downloaded over-the-air to the terminal device. It should be noted also that next generation wireless access technologies can be applied to the present disclosure.

The UI 304 can include a keypad 308 with depressible or touch sensitive navigation disk and keys for manipulating operations of the communication device 116. The UI 304 can further include a display 310 such as monochrome or color LCD (Liquid Crystal Display) for conveying images to the end user of the terminal device, and an audio system 312 that utilizes common audio technology for conveying and intercepting audible signals of the end user.

The power supply 314 can utilize common power management technologies such as replaceable batteries, supply regulation technologies, and charging system technologies for supplying energy to the components of the terminal device and to facilitate portable applications. In stationary applications, the power supply 314 can be modified so as to extract energy from a common wall outlet and thereby supply DC power to the components of the communication device 116.

The location receiver 316 can utilize common technology such as a common GPS (Global Positioning System) receiver that can intercept satellite signals and therefrom determine a location fix of the communication device 116.

The controller 306 can utilize computing technologies such as a microprocessor and/or digital signal processor (DSP) with associated storage memory such a Flash, ROM, RAM, SRAM, DRAM or other like technologies for controlling operations of the aforementioned components of the terminal device.

Figure 4:
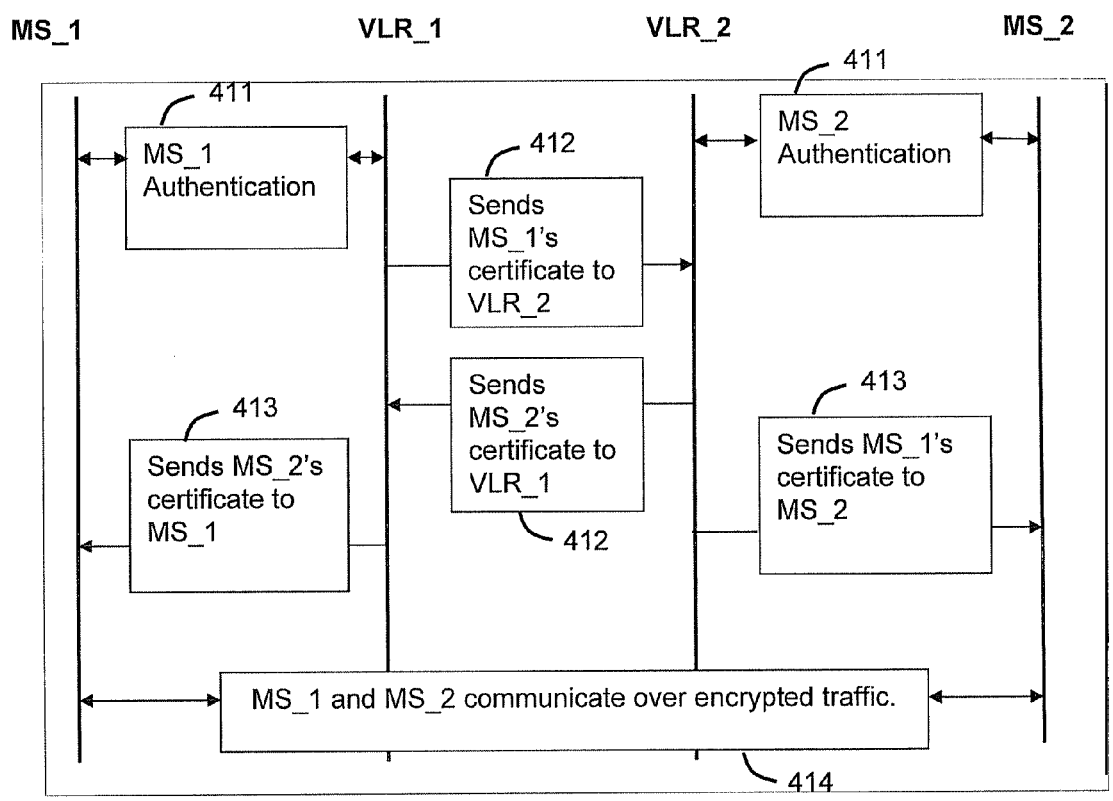
FIGS. 4-6 depict exemplary flow diagrams corresponding to methods operating in portions of the communication system.

FIG. 4 depicts an exemplary diagram 400 illustrating method steps for encrypting an end-to-end communication channel between at least two mobile stations (MSs). Diagram 400 illustrates steps associated with user authentication, certificate exchange, and data encryption between two end users operating two MSs in the communication system 100.

Briefly, each MS can be associated with a corresponding VLR to provide network authorization. For example, MS_1 can be associated with VLR_1, and MS_2 can be associated with VLR_2. At step 411, user authentication is performed for each of the at least two MSs. For example, VLR_1 can authenticate MS_1 on the GSM network. At approximately the same time, VLR_2 can authenticate MS_2 on the GSM network. User authentication can be a first step for both MSs and can ensure that the user is authorized to register on the network. During step 411, MS_1 and MS_2 can also each generate and send a public key to their corresponding VLR as will be explained later in method 500 of FIG. 5. In particular, a private key for each MS is used to generate the corresponding public key which is exchanged between MSs and VLRs.

At step 412, VLR_1 can generate and send MS_1's certificate to VLR_2, responsive to authenticating the MS_1. Notably, VLR_1 can generate the certificate from MS_1's public key. Upon receiving MS_1's certificate, VLR_2 can proceed to send MS_2's certificate to VLR_1, responsive to authenticating the MS_2. VLR_2 generates the certificate from MS_2's public key.

At step 413, VLR_2 can then proceed to send MS_1's certificate to the second user operating MS_2. At approximately the same time, VLR_1 can proceed to send MS_2's certificate to the first user operating MS_1. Each MS can then proceed to extract the other MS's public key from the received certificate to compute the shared secret key. At step 414, MS_1 and MS_2 can each user their own computed shared secret key to encrypt data communications between the two MSs.

Figure 5:
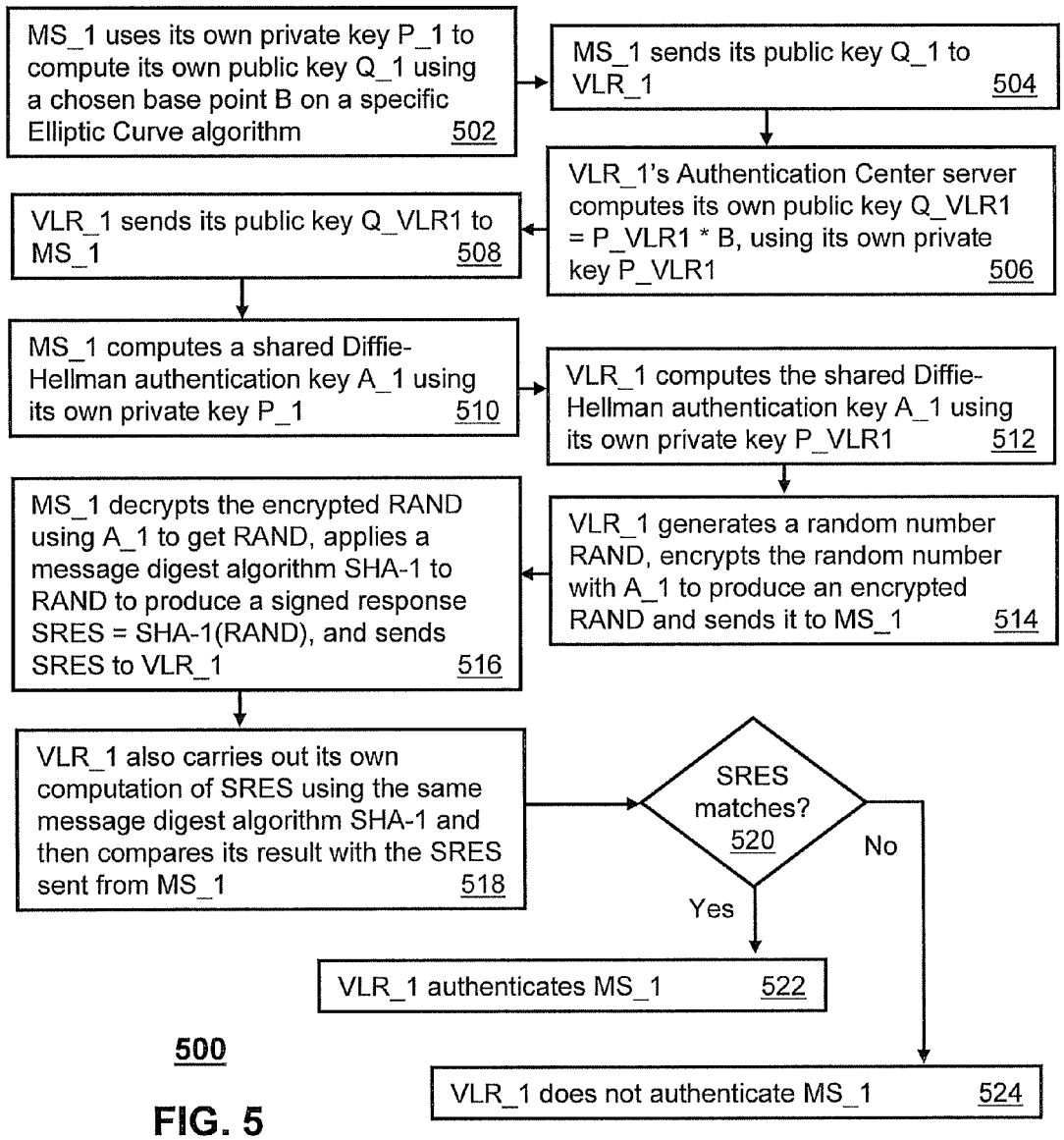

FIG. 5 depicts an exemplary method 500 operating in portions of the communication systems 100. Briefly, method 500 is directed to authenticating a user of a mobile station (MS) by way of a VLR, for example, in a GSM network. The method 500 shown corresponds to a particular embodiment for user authorization 411 presented in FIG. 4, though other steps can be included. When describing the method 500, reference will be made to FIG. 1 through 3, although it must be noted that the method 500 can be practiced in any other suitable system or device.

In the following example, a GSM subscriber User_1 operating MS_1 can roam into a visitor domain controlled by the visitor Location Register 1 (VLR_1). MS_1 can go through the following steps of method 500 to authenticate itself with the GSM network via VLR_1. It would be apparent to an artisan with ordinary skill in the art that other embodiments not depicted in FIG. 5 are possible without departing from the scope of the claims described below.

Method 500 begins with step 502 in which MS_1 can use its own private key P_1 to compute its own public key Q_1 using a chosen base point B on a specific Elliptic Curve algorithm. The base point "B" can be a random value selected from an elliptic curve algorithm. B does no need to be a secret value and can be available to devices within the communication system 100. In practice, providers within the communication system 100 can determine how the base point B is calculated and distributed among MSs and VLR's. For instance, in one embodiment a unique base point can be used for the entire GSM network that is pre-built into MSs' SIM cards and VLRs. Another implementation option provides a distinct and temporary base point B for each communication session.

At step 504, MS_1 can send its public key Q_1 to VLR_1, for example over the communication system 100, using packet based or circuit based communication. As another example, the public key Q_1 can be transmitted to VLR_1 over an Internet Protocol (IP) communication link. At step 506, VLR_1's Authentication Center server can compute its own public key Q_VLR1=P_VLR1*B, using its own private key P_VLR1. Notably, VLR_1 also can use the same base point B which is made available prior to the communication. VLR_1 can then send its public key Q_VLR1 to MS_1 as shown in step 508. At this point, both MS_1 and VLR_1 have each generated their own public key from their own respective private key, and exchanged the public keys with one another.

Each MS can use the public key received from the other MS along with its own private key to generate a shared Diffie-Hellman authentication key. For instance, at step 510, MS_1 computes the shared Diffie-Hellman authentication key A_1 using its own private key P_1:

$$A\_1 = P\_1 * Q\_VLR1 = P\_1 * P\_VLR1 * B$$
$$= P\_VLR1 * Q\_1 = P\_VLR1 * P\_1 * B$$

Note that the authentication key A_1 can be computed dynamically and individually by MS_1 and VLR_1 and it does not need to be stored in the VLR_1's Authentication Center database.

Similarly, at step 512, VLR_1 can compute the shared Diffie-Hellman authentication key A_1 using its own private key P_VLR1, in accordance with the same method steps above. As a result of the elliptic curve algorithm, the authentication key A_1 generated by MS_1 should be the same as the authentication key generated by VLR_1, as shown in the equation above. Although, neither MS_1 nor VLR_1 is aware of the authentication key A_1 value generated by the other, each can perform a subsequent operation together to validate the value.

For example, VLR_1 at step 514 can generate a random number RAND and then encrypt the random number with A_1 to produce an encrypted RAND. VLR_1 can then proceed to send the encrypted RAND to MS_1. At step 516, MS_1 decrypts the encrypted RAND using A_1 to get RAND. MS_1, can apply a message digest algorithm SHA-1 to RAND to produce a signed response SRES=SHA-1 (RAND), and then sends SRES to VLR_1. VLR_1 can also carry out its own computation of SRES using the same message digest algorithm SHA-1 and then compares its result with the SRES sent from MS_1 at step 518.

Figure 6:
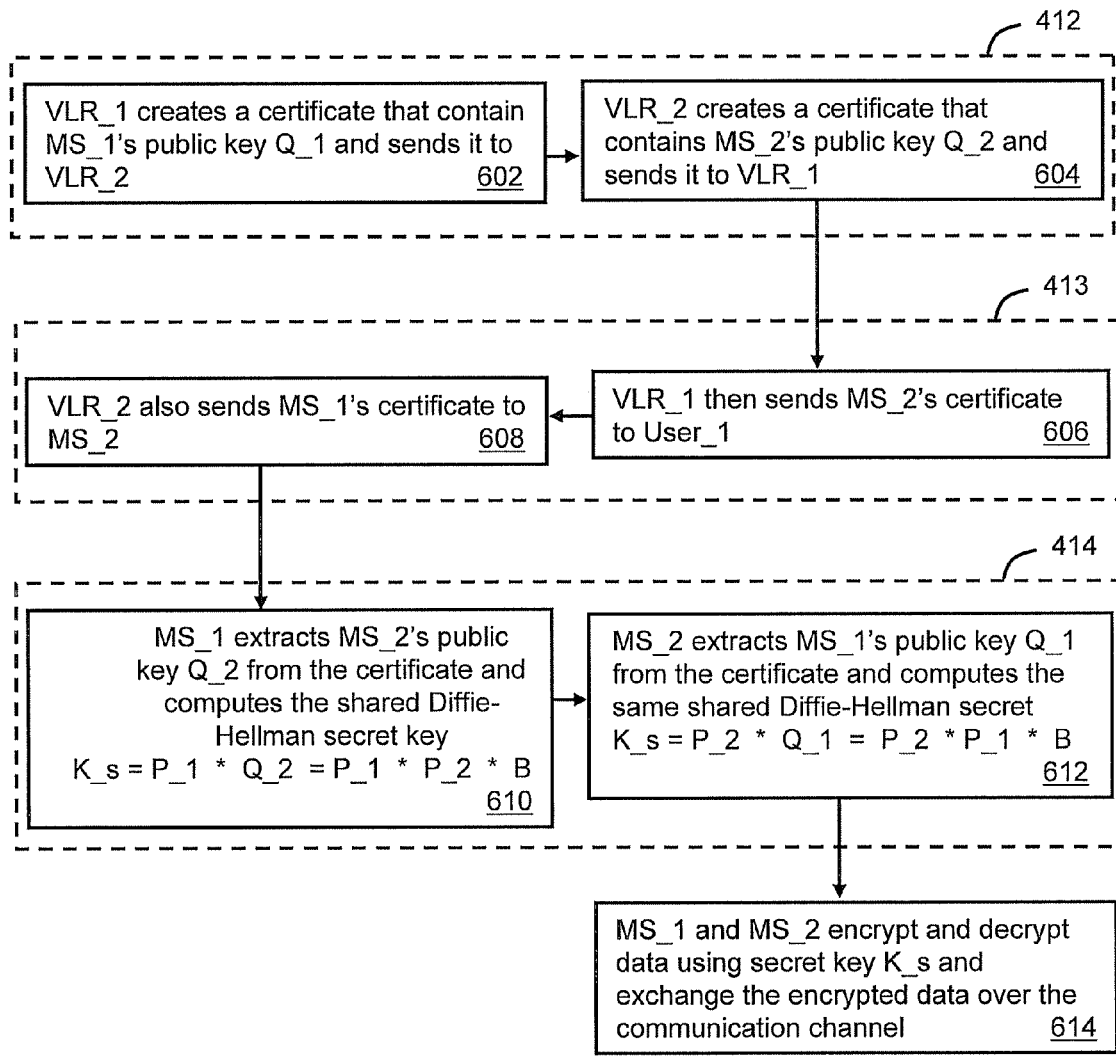

If at step 520, the SRES generated by VLR_1 matches the SRES received from MS_1, VLR_1 can then authenticate MS_1 with VLR_1, as shown in step 522. That is, VLR_1 authenticates that MS_1 does in fact hold the private key P_1 it claims, and authorizes MS_1 for communication through VLR_1. If however, the SRES generated by VLR_1 does not match the SRES received from MS_1, VLR_1 does not authenticate MS_1 with VLR_1, as shown in step 524. In such regard, VLR_1 cannot confirm that MS_1 does in fact have the private key P_1 it claims to have. Accordingly, VLR_1 cannot confirm to a second VLR_2 desiring to securely communicate with MS_1, that MS_1 is authorized to communicate on the cellular network 113. After authenticating User_1 of MS_1 and User_2 of MS_2, VLR_1, VLR_2 and each MS has the public key of its own subscriber User_1 and User_2, respectively Method 500 can further continue to method 600 shown in FIG. 6. Briefly, method 600 of FIG. 6 corresponds to one particular embodiment of the steps 412-414 previously presented in FIG. 4. It should be noted that method 600 can include more or less than the number of steps shown. When describing the method 600, reference will be made to FIGS. 1 through 3, although it must be noted that the method 600 can be practiced in any other suitable system or device.

At step 602, VLR_1 can create a certificate that contains MS_1's public key Q_1 and sends it to VLR_2. The certificate is an electronic document which can incorporate a digital signature to bind together the public key with an identity, for example information such as the name of a person or an organization, and/or their address. Similarly, at step 604, VLR_2 can create a certificate that contains MS_2's public key Q_2 and send it to VLR_1. It should also be noted that further means of security can be presented upon completion of steps 602 and 604 to protect the privacy of the certificate contents while they are being sent between VLRs. As one example, the signature can be endorsed by a certificate authority. Notably, the network providers or operators within the communication system 100 can determine a specific implementation for adding certificate privacy.

At step 606, VLR_1 can then send MS_2's certificate to User_1. Similarly, at step 608, VLR_2 can send MS_1's certificate to MS_2. MS_1 can extract MS_2's public key Q_2 from the certificate at step 610 and can compute the shared Diffie-Hellman secret key:

$$K\_s = P\_1 * Q\_2 = P\_1 * P\_2 * B$$

Similarly, MS_2 can extract MS_1's public key Q_1 from the certificate at step 612 and can compute the same shared Diffie-Hellman secret:

$$K\_s = P\_2 * Q\_1 = P\_2 * P\_1 * B$$

It should be noted that K_s is the same for both computations performed by MS_1 and MS_2. At step 614, MS_1 and MS_2 can encrypt and decrypt data using secret key K_s and can exchange the encrypted data over the communication channel. Notably, no other entity except MS_1 and MS_2 can compute K_s since no one other than MS_1 and MS_2 have the private keys P_1 and P_2, respectively.

The methods proposed herein improve the end-to-end security of the entire network, including the radio interface as well as the fixed signaling backbone network in multiple ways. For example, the communication channel between any two GSM subscribers can be entirely encrypted and hence eavesdropping attacks on the network can be suppressed, or entirely prevented and eliminated. As another example, authentication mechanisms can be secured without having to store subscribers' authentication keys in the GSM Authentication Center database. This prevents any type of masquerade attack on the network. As yet another example, Elliptic Curve Cryptosystem (ECC) are a public algorithm and have been intensively tested by many public cryptographic groups and have been proven to provide high security with much smaller key sizes as compared to others existing public-key algorithms. ECC can replace current GSM proprietary algorithms such as A3, A5, A8. Also, due to its highly efficient computational power, ECC in addition to use in GSM networks, can be applied as well to any other wireless network architectures that demand high security, low power and bandwidth consumption, storage efficiency, and smaller footprints.

Upon reviewing the aforementioned embodiments, it would be evident to an artisan with ordinary skill in the art that said embodiments can be modified, reduced, or enhanced without departing from the scope and spirit of the claims described below. As an example, wireless providers can replace all of their subscribers' old mobile station (MS) SIM cards with the new ones having a built-in or embedded Elliptic Curve Cryptosystem. During the transition to the ECC, the wireless providers can implement an interim solution to track all subscribers still using the former SIM cards. The wireless providers can continue to use the former security mechanism for legacy GSM users until the subscribers' SIM cards are replaced. Also, other embodiments target end-end security for mobile to mobile users across a PSTN network, or IP based network.

These are but a few examples of modifications that can be applied to the present disclosure without departing from the scope of the claims. Accordingly, the reader is directed to the claims section for a fuller understanding of the breadth and scope of the present disclosure.

Figure 7:
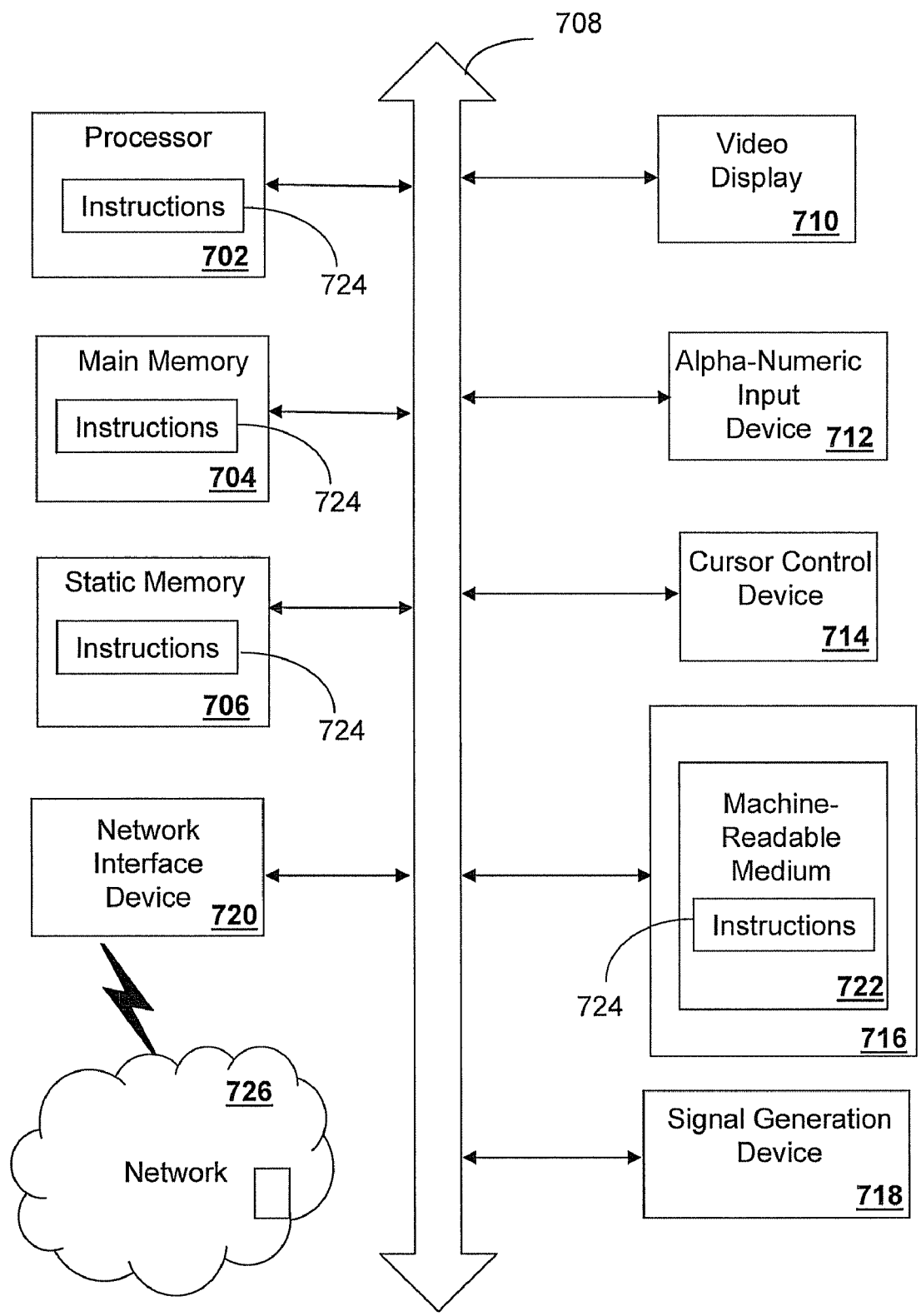
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a mass storage medium 716, a signal generation device 718 (e.g., a speaker or remote control) and a network interface device 720.

The mass storage medium 716 may include a computer-readable storage medium 722 on which is stored one or more sets of instructions (e.g., software 724) embodying any one or more of the methodologies or functions described herein, including those methods illustrated above. The computer-readable storage medium 722 can be an electromechanical medium such as a common disk drive, or a mass storage medium with no moving parts such as Flash or like non-volatile memories. The instructions 724 may also reside, completely or at least partially, within the main memory 704, the static memory 706, and/or within the processor 702 during execution thereof by the computer system 700. The main memory 704 and the processor 702 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the computer-readable storage medium 722 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for cellular communications (SM-GPRS, EDGE, CDMA-1X, UMTS, WiMAX, SDR) and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer readable storage medium, comprising computer instructions for:

providing information associated with an Elliptic Curve Diffie-Hellman (ECDH) cryptosystem to a group of Mobile Stations (MSs) using a base transceiver station;

authenticating a first MS of the group of MSs using a first Visitor Location Register (VLR) of a Mobile Switching Center (MSC) and authenticating a second MS of the group of MSs with a second VLR of the MSC;

sending a first certificate of the first MS from the first VLR to the second VLR and sending a second certificate of the second MS from the second VLR to the first VLR; and sending the first certificate from the second VLR to the second MS and sending the second certificate from the first VLR to the first MS, wherein data communicated between the first MS and the second MS is encrypted with a secret key computed individually by both the first MS and the second MS from the first certificate and the second certificate, respectively.

2. The non-transitory storage medium claim 1, wherein the information associated with the ECDH cryptosystem is provided to the base transceiver station using a first mode of communication, and wherein the information associated with the ECDH cryptosystem is provided to the group of Mobile Stations (MSs) using a second mode of communication.

3. The non-transitory storage medium claim 1, wherein at least one of the first VLR and the second VLR generates a random number RAND, encrypts the random number using the secret key, and sends the encrypted random number to at least one of the first MS and the second MS.

4. A network element comprising a memory coupled to a controller, the controller operable to:
provide information associated with an Elliptic Curve Diffie-Hellman (ECDH) cryptosystem to a group of Mobile Stations (MSs) using a base transceiver station;
authenticate a first MS of the group of MSs using a first Visitor Location Register (VLR) of a Mobile Switching Center (MSC) and authenticating a second MS of the group of MSs with a second VLR of the MSC;
send a first certificate of the first MS from the first VLR to the second VLR and sending a second certificate of the second MS from the second VLR to the first VLR; and
send the first certificate from the second VLR to the second MS and sending the second certificate from the first VLR to the first MS, wherein data communicated between the first MS and the second MS is encrypted with a secret key computed individually by both the first MS and the second MS from the first certificate and the second certificate, respectively.

5. The network element of claim 4, wherein the information associated with the ECDH cryptosystem enables public key and private key generation.

6. The network element of claim 4, wherein at least one MS of the at least two MSs includes an identity module storing at least a portion of the information associated with the ECDH cryptosystem.

7. The network element of claim 4, wherein the MSC includes an authentication center, a Home Location Register or the first and second VLR implementing the key exchange algorithm.

8. The network element of claim 4, wherein at least one MS of the at least two MSs communicates with the network element over a Radio Frequency (RF) link, and the MSC communicates with the network element over a signaling link, both the RF link and the signaling link providing secure encryption between the at least two MSs.

9. The network element of claim 4, wherein the MSC supports communication access over at least one among Global Systems Mobile, Code Division Multiple Access, Orthogonal Frequency Division Multiple Access and Universal Mobile Telecommunication System.

10. A server comprising a memory coupled to a controller, the controller operable to:
implement an Elliptic Curve Diffie-Hellman (ECDH) cryptosystem and manage a key exchange, authentication, and certificate exchange with first and second communication devices also implementing the ECDH cryptosystem, wherein the server communicates over a network that provides an encrypted communication link for the first and second communication devices;
authenticate the first communication device using a first Visitor Location Register (VLR) of a Mobile Switching Center (MSC);
authenticate a second communication device with a second VLR of the MSC,
send a first certificate of the first communication device from the first VLR to the second VLR;
send a second certificate of the second communication device from the second VLR to the first VLR; and
send the first certificate from the second VLR to the second communication device;
send the second certificate from the first VLR to the first communication device, wherein data communicated between the first communication device and the second communication device is encrypted with a secret key computed individually by both the first communication device and the second communication device according to the first certificate and the second certificate, respectively.

11. The server of claim 10, wherein the controller is adapted to compute an authentication key using its own private key, send the authentication key to one of the first and second communication devices, generate a random number, encrypts the random number with the authentication key, and send the encrypted random number to the one of the first and second communication devices.

12. The server of claim 10, wherein one of the first and second communication devices generates a signed response that is sent back to the controller, and the controller authenticates the one of the first and second communication devices on the network if the signed response received from the one of the first and second communication devices matches its own computed signed response.

13. The server of claim 12, wherein the authentication key is created dynamically for authentication, such that it is not stored in a database associated with the first or second communication devices or the MSC associated with the server.

14. The server of claim 13, wherein the MSC includes an authentication center (AuC), a Home Location Register (HLR), or the first and second VLRs implementing the ECDH cryptosystem.

15. A method comprising:
implementing an Elliptic Curve Diffie-Hellman (ECDH) cryptosystem on at least two Mobile Stations (MSs) and a Mobile Switching Center (MSC), wherein each of the at least two MSs produces its own secret key used for data encryption from its own respective private keys during a key exchange; and
authenticating a first Mobile Station (MS) of the at least two MSs with a first Visitor Location Register (VLR) of the MSC and authenticating a second MS of the at least two MSs with a second VLR of the MSC;
sending a first certificate of the first MS from the first VLR to the second VLR and sending a second certificate of the second MS from the second VLR to the first VLR;
sending the first certificate from the second VLR to the second MS and sending the second certificate from the first VLR to the first MS; and
encrypting data communicated between the first MS and the second MS with a secret key computed individually by both the first MS and the second MS from the first certificate and the second certificate, respectively, thereby providing an encrypted communication link between the at least two MSs using the ECDH cryptosystem.

16. The method of claim 15, comprising replacing A3, A5, and A8 Global Systems Mobile ciphering algorithms with the ECDH cryptosystem in both the at least two MSs and the MSC.

17. The method of claim 15, wherein the first MS uses its own private key $P\_1$ to compute its own public key $Q1$ using a chosen base point B on an Elliptic Curve algorithm $Q=P\_1*B\_1$, and sends its public key $Q\_1$ to the first VLR that computes its own public key $Q\_VLR1$ using its own private key $P\_VLR1$ and sends its own public key $Q\_VLR1$ to the first MS.

18. The method of claim 17, wherein the first MS computes a shared authentication key $A\_1$ from its own private key $P\_1$ and the public key $Q\_VLR1$ received from the first VLR, and the first VLR computes the shared authentication key $A\_1$ from its own private key $P\_VLR1$ and the public key $Q\_1$ received from the MS.

19. The method of claim 18, wherein the first VLR generates a random number RAND, encrypts the random number with the shared authentication key $A\_1$ to produce an encrypted random number, and sends the encrypted random number to the first MS, and the first MS decrypts the encrypted random number using its shared authentication key $A\_1$ to produce the RAND.

20. The method of claim 19, wherein the first MS applies a message digest algorithm SHA to the random number RAND to produce a signed response SRES, and sends the signed response SRES to the first VLR, and the first VLR carries out its own computation of the signed response SRES using the message digest algorithm SHA, and authenticates the first MS if its own computation of the signed response SRES matches the signed response SRES from the first MS.

21. The method of claim 19, wherein
the first MS extracts the public key $P\_2$ of the second MS from the second certificate and computes its own secret key;
the second MS extracts the public key $P\_1$ of the first MS from the first certificate and computes its own secret key; and the first MS and the second MS encrypt data exchanged between the first MS and the second MS individually each using their own secret key.

22. The method of claim 15, wherein
the first VLR creates a first certificate that contains a public key $P\_1$ of the first MS, and sends the first certificate to the second VLR which sends the first certificate to the second MS, and
the second VLR creates a second certificate that contains a public key $P\_2$ of the second MS, and sends the second certificate to the first VLR which sends the second certificate to the first MS.

* * * * *